United States Patent
Aust et al.

(10) Patent No.: US 7,699,158 B2
(45) Date of Patent: Apr. 20, 2010

(54) CONVEYING DEVICE

(75) Inventors: Stefan Aust, Niedernhausen (DE); Hans-Joachim Schoepe, Taunusstein (DE)

(73) Assignee: Smiths Heimann GmbH, Wiesbaden (DE)

(*) Notice: Subject to any disclaimer, the term of this patent is extended or adjusted under 35 U.S.C. 154(b) by 0 days.

(21) Appl. No.: 11/854,521

(22) Filed: Sep. 12, 2007

(65) Prior Publication Data
US 2008/0000754 A1    Jan. 3, 2008

Related U.S. Application Data

(63) Continuation of application No. PCT/EP2006/002251, filed on Mar. 10, 2006.

(30) Foreign Application Priority Data

Mar. 12, 2005 (DE) ............ 10 2005 011 466

(51) Int. Cl.
*B65G 47/26* (2006.01)

(52) U.S. Cl. ............... 198/435; 198/369.1

(58) Field of Classification Search ......... 198/369.1, 198/369.6, 435, 463.3
See application file for complete search history.

(56) References Cited

U.S. PATENT DOCUMENTS

| | | | | |
|---|---|---|---|---|
| 2,790,567 | A * | 4/1957 | Rockhill | 198/463.3 |
| 3,050,200 | A * | 8/1962 | Siempelkamp | 198/435 |
| 3,403,799 | A * | 10/1968 | Sindzinski et al. | 198/435 |
| 4,867,299 | A * | 9/1989 | Fukuoka et al. | 198/435 |
| 5,466,290 | A * | 11/1995 | Berta | 118/20 |
| 5,636,727 | A * | 6/1997 | Neri et al. | 198/463.3 |
| 6,220,420 | B1 * | 4/2001 | Jan et al. | 198/369.1 |
| 6,394,257 | B1 | 5/2002 | Wheeler | |
| 6,557,724 | B1 * | 5/2003 | LeCroy et al. | 198/435 |
| 2003/0168313 | A1 | 9/2003 | Hiroki | |
| 2003/0226739 | A1 * | 12/2003 | Goussev | 198/465.1 |

FOREIGN PATENT DOCUMENTS

| | | |
|---|---|---|
| DE | 3806036 A1 | 9/1989 |
| EP | 0909724 A | 4/1999 |
| EP | 1298055 A | 4/2003 |
| JP | 62249818 A | 10/1987 |

* cited by examiner

*Primary Examiner*—James R Bidwell
(74) *Attorney, Agent, or Firm*—Muncy, Geissler, Olds & Lowe, PLLC

(57) ABSTRACT

A conveying device is provided in systems for safety checking items of luggage or cargo, comprising at least one baggage switch with at least two horizontal conveyors, which are parallelly arranged one above the other at a fixed distance and which can be vertically displaced with the aid of an elevator.

13 Claims, 2 Drawing Sheets

CONVEYING DEVICE

This nonprovisional application is a continuation of International Application No. PCT/EP2006/002251, which was filed on Mar. 10, 2006, and which claims priority to German Patent Application No. DE 102005011466, which was filed in Germany on Mar. 12, 2005, and which are both herein incorporated by reference.

BACKGROUND OF THE INVENTION

1. Field of the Invention

The present invention relates to a conveying device in systems for security checks of items of luggage or freight.

2. Description of the Background Art

In security checks of items of luggage or freight, it is frequently necessary to remove individual objects from the total stream and to reintroduce them, for example, to subject them to a special examination. The object stream must also often be subdivided into two or more substreams, for example, when certain elements of the inspection chain have a too low throughput, and a parallelization of the object stream is therefore desired at this site. For this purpose, switches are known which are typically designed in the form of a horizontal Y and permit a separation or sorting of the object stream. The disadvantage of such switches, however, is that they require a relatively large floor area and therefore have only limited use in tighter spaces.

SUMMARY OF THE INVENTION

It is therefore an object of the present invention to provide a conveying device that makes it possible with a small floor area to remove and/or introduce individual objects or to divide and/or combine an object stream.

This object of the invention is attained by a conveying device having at least one baggage switch with at least two horizontal conveyors arranged parallel one above the other at a fixed distance and movable vertically with the aid of an elevator.

The basic principle is the vertical separation of the objects. In this case, in this document, separation can mean the dividing or combining of an object stream as well as the removal or introduction of individual objects. This occurs by means of so-called baggage switches, which include an elevator with horizontal conveyor arranged parallel one above the other at a fixed distance. Objects are taken to the baggage switch by a conveying means and can be raised or lowered to other levels. In this regard, the relative position of the horizontal conveying means is unchangeable relative to each other; the moving between the different positions therefore always relates simultaneously to the entire arrangement of the horizontal conveying means. The horizontal conveying means per se can be operated independently of one another, however. This refers to both the transport direction and also to whether a horizontal conveying means is standing still or performing a transport process. In the case of horizontal conveying means this can refer in particular to belt conveyors or roller conveyors.

The objects are supplied to the baggage switch via a main conveying path, which is typically continued behind the baggage switch at the same height. The vertical baggage switch now lifts objects to another level or lowers objects to another level. At these levels, the object can be removed directly manually from the baggage switch or transported further by means of a connecting conveying means or a secondary conveying path.

In an embodiment, the conveying device has two baggage switches. In this case, conveying means are arranged in an advantageous manner between the baggage switches at at least one reachable position. Thus, the object flow can be parallelized at the first baggage switch and again combined at the second switch.

The object stream or the state of the conveying device can be monitored by sensors such as, for example, photosensors. The total process can be controlled, for example, by a programmable logic controller (PLC). The entire security check can be automated by incorporating inspection devices such as x-ray inspection systems.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
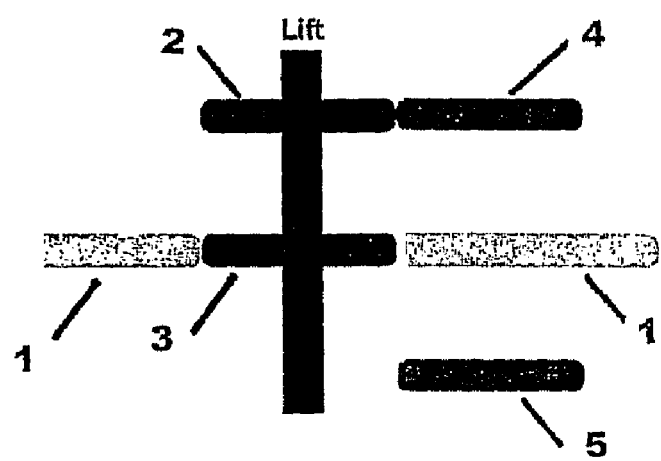
FIG. 1 illustrates a conveying device with a baggage switch, according to an embodiment of the present invention.

FIG. 1 shows a conveying device in a system for security checking of items of luggage or freight with a baggage switch comprising two horizontal conveyors 2 and 3, arranged parallel one above the other at a fixed distance and movable vertically with use of an elevator. The horizontal conveyors 2 and 3 can be belt conveyors. Alternatively, other conveying means such as, for example, ball mats or roller conveyors can be used. In the present example, the objects are supplied via a feed path of the baggage switch and taken away via a removing path. The feed and removing paths together form a main conveying path 1.

In the position of the baggage switch, as shown in FIG. 1, the main conveying path 1 is made substantially continuous by belt conveyor 3, so that an unimpeded flow of objects can occur. If an object is to be removed, it is held on belt conveyor 3 and the baggage switch is moved to another lower position. In this position, the object can be moved from belt conveyor 3 to belt conveyor 5, whereas belt conveyor 2 now continues as main conveyor path 1. Another object can be removed in that it is held on belt conveyor 2 and the baggage switch is again moved into the position shown in FIG. 1. The second object can now be moved from belt conveyor 2 to belt conveyor 4. The objects can be reintroduced into main conveyor path 1 by reversing the conveying direction of belt conveyors 2 and 4 or 3 and 5 and moving the baggage switch accordingly. This occurs by a motorized traveling unit for positioning the elevator. Electrical and hydraulic drives are particularly suitable as the motorized traveling unit. A cantilever lift is used preferably as the elevator.

In the area of belt conveyors 4 and 5, either manual removal of the object or an automatic analysis with use of an inspection device can occur. It is possible, furthermore, that by means of the baggage switch individual objects are not removed and reintroduced but the objects are alternatively distributed on belts 4 or 5, inspected there, and again taken to main conveying path 1. The throughput of the system can be considerably increased by this parallelization of the inspection.

Figure 2:
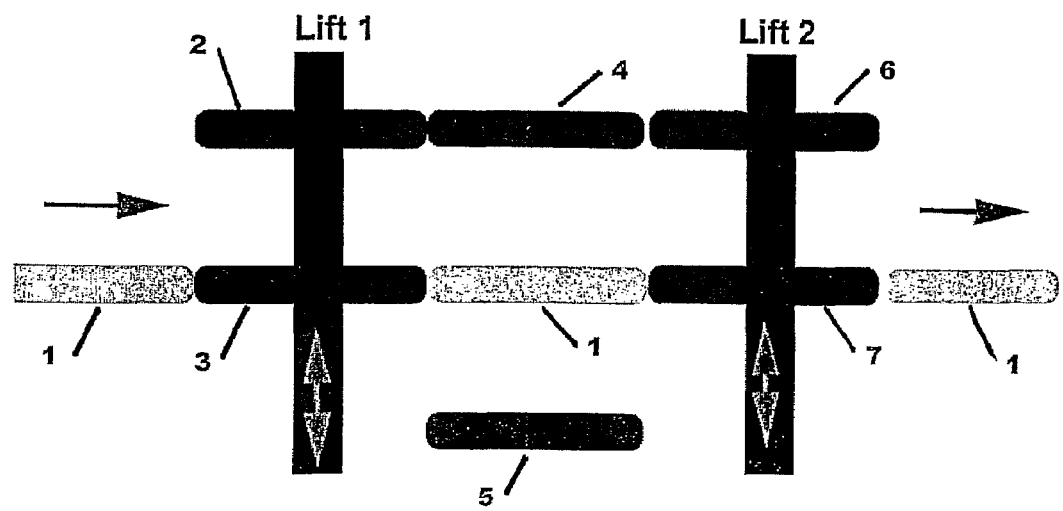
FIG. 2 illustrates a conveying device with two baggage switches, according to an embodiment of the present invention.

FIG. 2 shows a conveying device with two baggage switches. The basic structure corresponds to that in FIG. 1, with the difference that main conveying path 1 is interrupted by a second baggage switch. In this case, intermediate conveying means are arranged between the two baggage switches. In the present example, these are designed as belt conveyors 6 and 7 and arranged so that depending on the position of the baggage switch they connect to belt conveyors 4 or 5 or the middle part of main conveyor path 1 between the baggage switches. For that purpose, the vertical distance of the intermediate conveying means corresponds preferably to the distance of the horizontal conveying means of the baggage switches.

The distribution of the objects on belt conveyors 4 and 5 and the middle section of main conveying path 1 occurs as described in the first example with use of FIG. 1. The back transport of the objects from belt conveyors 4 and 5 to main conveying path 1, however, does not occur by reversing the conveying direction but by means of the second baggage switch. In this embodiment as well, there are the same options for manual removal of objects or automatic analysis, as in the first example, in the area of belt conveyors 4 and 5 or in the middle area of main conveyor path 1. The advantages of this system comprising two baggage switches is that first the conveying direction need not be reversed and second the distribution of the objects can be designed more flexibly, for example, when the inspection of an object takes an exceptionally long time. It is emphasized here that connecting conveying means need not necessarily be present at all reachable positions between the baggage switches.

The aforementioned exemplary embodiments are provided purely by way of example and are not limiting in this respect. In particular, the type of conveying means and their number can vary. The conveying device may also have more than two baggage switches, for example, to realize several examination stages.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A conveying device for an apparatus for security checks of items of baggage or freight, the device comprising:
    a first baggage switch comprising a support having a longitudinal axis and first and second conveyors fixed to said support against longitudinal movement relative to said support, said first and second conveyors extending perpendicularly to said longitudinal axis for conveying objects in a first direction perpendicular to said longitudinal axis,
    an elevator for moving said support and first and second conveyors in second and third directions parallel to the longitudinal axis;
    a second baggage switch spaced from said first baggage switch in the first direction, the second baggage switch comprising a support having a longitudinal axis and first and second conveyors fixed to said support against longitudinal movement relative to said support, said first and second conveyors extending perpendicularly to said longitudinal axis for conveying objects in the first direction; and
    third and fourth parallel conveyors between said first baggage switch and said second baggage switch,
    wherein, when said first conveyor of said first baggage switch and said first conveyor of said second baggage switch are aligned, said third conveyor extends from a first end of the first conveyor of the first baggage switch to a first end of the first conveyor of the second baggage switch, and when said second conveyor of said first baggage switch and said second conveyor of said second baggage switch are aligned, said fourth conveyor extends from a first end of the second conveyor of the first baggage switch to a first end of the second conveyor of the second baggage switch.

2. The conveying device according to claim 1, wherein the first horizontal conveyor is a belt conveyor.

3. The conveying device according to claim 1, further comprising a motorized traveling unit for positioning the elevator.

4. The conveying device according to claim 1, further comprising at least one supply path to the at least one baggage switch.

5. The conveying device according to claim 1, further comprising at least one removal path from the at least one baggage switch.

6. The conveying device according to claim 1, further comprising at least one intermediate conveyor provided between each of two baggage switches.

7. A method of performing security checks of items of baggage or freight comprising:
    providing a conveying device comprising:
        a first baggage switch comprising a support having a longitudinal axis and first and second conveyors fixed to said support against longitudinal movement relative to said support, said first and second conveyors extending perpendicularly to said longitudinal axis for conveying objects in a first direction perpendicular to said longitudinal axis,
        an elevator for moving said support and first and second conveyors in second and third directions parallel to the longitudinal axis;
        a second baggage switch spaced from said first baggage switch in the first direction, the second baggage switch comprising a support having a longitudinal axis and first and second conveyors fixed to said support against longitudinal movement relative to said support, said first and second conveyors extending perpendicularly to said longitudinal axis for conveying objects in the first direction; and
        third and fourth parallel conveyors between said first baggage switch and said second baggage switch;
    moving the first baggage switch to align the first conveyor of the first baggage switch with the third conveyor;
    moving the second baggage switch to align the first conveyor of the second baggage switch with the third conveyor;
    after the first conveyor of the first baggage switch and the first conveyor of the second baggage switch are aligned with the third conveyor, moving the first conveyor of the first baggage switch to align the first conveyor of the first baggage switch with the fourth conveyor and moving the first conveyor of the second baggage switch to align the first conveyor of the second baggage switch with the fourth conveyor.

8. The method of claim 7 including:
  providing a fifth conveyor parallel to the third and fourth conveyors such that the third conveyor is located between the fourth and fifth conveyors;
  after the first conveyor of the first baggage switch and the first conveyor of the second baggage switch are aligned with the fourth conveyor, moving the first baggage switch to align the second conveyor of the first baggage switch with the fifth conveyor and moving the second baggage switch to align the second conveyor of the second baggage switch with the fifth conveyor.

9. A conveying device for an apparatus for security checks of items of baggage or freight, the device comprising:
  a first baggage switch comprising a support having a longitudinal axis and first and second conveyors fixed to said support against longitudinal movement relative to said support, said first and second conveyors extending perpendicularly to said longitudinal axis for conveying objects in a first direction perpendicular to said longitudinal axis,
  an elevator for moving said support and first and second conveyors in second and third directions parallel to the longitudinal axis;
  a second baggage switch spaced from said first baggage switch in the first direction, the second baggage switch comprising a support having a longitudinal axis and first and second conveyors fixed to said support against longitudinal movement relative to said support, said first and second conveyors extending perpendicularly to said longitudinal axis for conveying objects in the first direction;
  third, fourth and fifth mutually parallel conveyors between said first baggage switch and said second baggage switch, said fourth conveyor extending between said third and fifth conveyors,
  wherein, said first baggage switch is shiftable between first and second positions along the longitudinal axis of said support of said first baggage switch, in said first position, said first conveyor of said first baggage switch being aligned with said third conveyor and said second conveyor of said first baggage switch being aligned with said fourth conveyor and in said second position, said first conveyor of said first baggage switch being aligned with said fourth conveyor and said second conveyor of said first baggage switch being aligned with said fifth conveyor.

10. The conveying device of claim 9 wherein said second baggage switch is shiftable between first and second positions along the longitudinal axis of said support of said second baggage switch, in said first position, said first conveyor of said second baggage switch being aligned with said third conveyor and said second conveyor of said second baggage switch being aligned with said fourth conveyor and in said second position, said first conveyor of said second baggage switch being aligned with said fourth conveyor and said second conveyor of said second baggage switch being aligned with said fifth conveyor.

11. A method of performing security checks of items of baggage or freight comprising:
  providing a conveying device comprising:
    a baggage switch comprising a support having a longitudinal axis and first and second conveyors fixed to said support against longitudinal movement relative to said support, said first and second conveyors extending perpendicularly to said longitudinal axis for conveying objects in first and second directions perpendicular to said longitudinal axis,
    an elevator for moving said support and first and second conveyors in third and fourth directions parallel to the longitudinal axis;
    a first conveying device on a first side of said baggage switch for conveying items toward said baggage switch and a second conveying device on a second side of said baggage switch for conveying items away from said baggage switch;
    a third conveyor above or below said second conveying device;
  moving the baggage switch to align the first conveyor of the baggage switch with the first and second conveying devices;
  driving the first conveying device to move an item on the first conveying device onto the first conveyor;
  moving the baggage switch to align the first conveyor of the baggage switch with the third conveyor;
  driving the first conveyor to move the item from the first conveyor onto the third conveyor;
  driving the third conveyor to move the item from the third conveyor onto the first conveyor;
  moving the baggage switch to align the first conveyor with the first and second conveying devices; and
  driving the first conveyor to move the item from the first conveyor onto the second conveying device.

12. The method of claim 11 including the additional step of, while the first conveyor is aligned with the third conveyor, driving the first conveying device to move objects on the first conveying device onto the second conveyor and driving the second conveyor to move objects on the second conveyor onto the second conveying device.

13. The method of claim 11 including providing a fourth conveyor on a side of the second conveying device opposite from the third conveyor and moving the baggage switch to align the second conveyor with the fourth conveyor.

* * * * *